United States Patent [19]

Dillmann

[11] Patent Number: 5,172,942
[45] Date of Patent: Dec. 22, 1992

[54] FLUID COUPLING

[75] Inventor: Charles W. Dillmann, Morgan Hill, Calif.

[73] Assignee: General Electric Company, San Jose, Calif.

[21] Appl. No.: 654,447

[22] Filed: Feb. 12, 1991

[51] Int. Cl.$^5$ .............................................. F16L 35/00
[52] U.S. Cl. ...................................... 285/39; 285/340; 285/360; 285/376; 285/401
[58] Field of Search ............... 285/340, 360, 376, 401, 285/379, 380, 39

[56] References Cited

U.S. PATENT DOCUMENTS

| | | | |
|---|---|---|---|
| 375,547 | 12/1887 | Gibbs | 285/376 X |
| 765,225 | 7/1904 | Colin | 285/376 X |
| 936,566 | 10/1909 | Rosendahl | 285/401 X |
| 943,900 | 12/1909 | Smith | 285/376 |
| 1,019,558 | 3/1912 | Thompson | 285/39 X |
| 1,051,805 | 1/1913 | Danberg | 285/376 |
| 1,589,469 | 6/1926 | Homand | 285/376 X |
| 1,591,871 | 7/1926 | Heinrich | 285/376 X |
| 2,111,740 | 3/1938 | Ruane | 285/376 X |
| 2,684,860 | 7/1954 | Rafferty | 285/376 X |
| 2,919,937 | 1/1960 | Dovey | 285/360 X |
| 3,606,390 | 9/1971 | Taylor | 285/39 |
| 3,645,562 | 2/1972 | Fandetti et al. | 285/360 X |
| 4,221,408 | 9/1980 | Lochte et al. | 285/281 X |
| 4,310,933 | 1/1982 | Stratman | 285/360 X |
| 4,428,588 | 1/1984 | Oelke | 277/166 X |
| 4,688,833 | 8/1987 | Todd | 285/376 X |
| 4,869,428 | 9/1989 | Gombar | 285/360 X |

FOREIGN PATENT DOCUMENTS

| | | | |
|---|---|---|---|
| 219915 | 2/1962 | Austria | 285/376 |
| 822559 | 9/1969 | Canada | 285/360 |
| 153746 | 3/1956 | Sweden | 285/360 |

Primary Examiner—Randolph A. Reese
Assistant Examiner—Heather Chun
Attorney, Agent, or Firm—Robert R. Schroeder

[57] ABSTRACT

A fluid coupling includes first and second connectable fittings. Each of the fittings include a body, an annular seat, and a fluid channel extending through the body and seat thereof. The first fitting includes a pair of latch bosses, and the second fitting includes a pair of latch arms, with the second fitting being rotatable relative to the first fitting to a latched position wherein the latch arms engage the latch bosses for maintaining the first seat adjacent to the second seat for allowing fluid to flow between the first and second channels. The fittings are also rotatable to a disengaged position wherein the latch arms and pins are disengaged to allow the first and second seats to be separated.

9 Claims, 3 Drawing Sheets

FLUID COUPLING

Technical Field

The present invention relates generally to fluid couplings, and, more specifically, to a connectable, high pressure, fluid coupling usable in a high temperature, underwater environment in a nuclear reactor vessel.

BACKGROUND ART

A conventional separable fluid coupling typically includes two separate fittings which may be suitably connected together or disconnected from each other for providing a sealed fluid through-channel when connected, while allowing the disassembly of attached components when disconnected. In order to effectively seal the fluid being channeled through the coupling from leaking therefrom, conventional couplings typically include elastomeric seals such as O-rings. However, such seals are typically life limited at relatively high temperatures experienced by the fluid coupling. For example, in a boiling water nuclear reactor vessel, high temperature water of about 518° F. (270° C.) is channeled within the vessel. At such a high temperature, a conventional fluid coupling disposed underwater in the vessel is not desirable in view of the typically low service life associated with the elastomeric seals.

Furthermore, the coupling typically includes screw threads which are used for assembling and disassembling the fittings thereof and is also formed of a suitable high temperature material such as conventional stainless steel. However, at the high temperature experienced, the threads are subject to slight corrosion which may cause the coupling fittings to freeze together which increases the difficulty of separating the coupling when desired.

Since a fluid coupling in a nuclear reactor vessel is typically located underwater, it is desirable to provide a fluid coupling which is relatively easily connected and disconnected underwater and from a distance by conventional tooling. For example, in one form of a nuclear reactor, an improved hydraulically driven turbine is being considered which may be used for controlling the conventional insertion and withdrawal of conventional control rods of the reactor. The turbine uses high pressure fluid, such as water, for driving the turbine in either of two opposite directions for controlling the position of the control rods. The turbine is located near the bottom of the nuclear reactor vessel under the high temperature water and is provided with its high pressure driving fluid through a suitable high pressure conduit. In order to allow improved maintainability of the turbine control rod drive, a suitable fluid coupling is desired within the high pressure conduit for allowing the coupling to be readily connectable and disconnectable from a considerable distance therefrom out of the reactor water while the coupling is positioned under the water.

OBJECTS OF THE INVENTION

Accordingly, one object of the present invention is to provide a new and improved fluid coupling which is readily connectable and disconnectable.

Another object of the present invention is to provide a fluid coupling usable in a high temperature, underwater environment of a nuclear reactor vessel which may be connected and disconnected from outside the water.

Another object of the present invention is to provide a fluid coupling having an improved seal therein for operation at high temperature.

Another object of the present invention is to provide a fluid coupling which may be readily disconnected in the event the fittings thereof freeze together due to corrosion thereof.

DISCLOSURE OF INVENTION

A fluid coupling includes first and second connectable fittings. Each of the fittings include a body, an annular seat, and a fluid channel extending through the body and seat thereof. The first fitting includes a pair of latch bosses, and the second fitting includes a pair of latch arms, with the second fitting being rotatable relative to the first fitting to a latched position wherein the latch arms engage the latch bosses for maintaining the first seat adjacent to the second seat for allowing fluid to flow between the first and second channels. The fittings are also rotatable to a disengaged position wherein the latch arms and bosses are disengaged to allow the first and second seats to be separated.

BRIEF DESCRIPTION OF DRAWINGS

The novel features believed characteristic of the invention are set forth and differentiated in the claims. The invention, in accordance with a preferred, exemplary embodiment, together with further objects and advantages thereof, is more particularly described in the following detailed description taken in conjunction with the accompanying drawing in which:

MODE(S) FOR CARRYING OUT THE INVENTION

Figure 1:
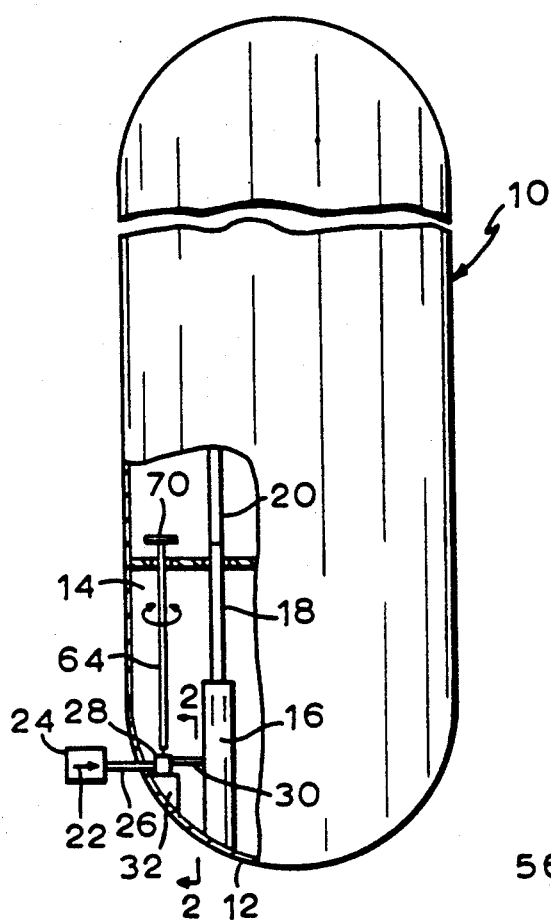
FIG. 1 is a schematic partly sectional view of an exemplary nuclear reactor including a fluid coupling in accordance with one embodiment of the present invention.

Illustrated in FIG. 1 is a nuclear reactor 10 including a pressure vessel 12 in which is conventionally channeled a high temperature fluid, or water, 14. Disposed under the water 14 is a turbine driven control rod drive 16 having an extendable and retractable output shaft 18. The output shaft 18 is conventionally connected to a control rod 20 which is conventionally positioned within the vessel 12 by the drive 16 upon insertion and withdrawal of the output shaft 18.

The control rod drive 16 is provided with a high pressure driving fluid, such as water, 22 from a conventional fluid supply 24. More specifically, a first fluid conduit 26 channels the driving fluid 22 from the supply 24 through the wall of the vessel 12 to a fluid coupling 28 in accordance with one embodiment of the present invention. A second fluid conduit 30 joins the coupling 28 to the control rod drive 16 for channeling the driving fluid 22 thereto. The fluid coupling 28 is conventionally fixedly joined, by bolts or by welding, for example, to a stationary support 32 extending from the vessel 12.

Figure 2:
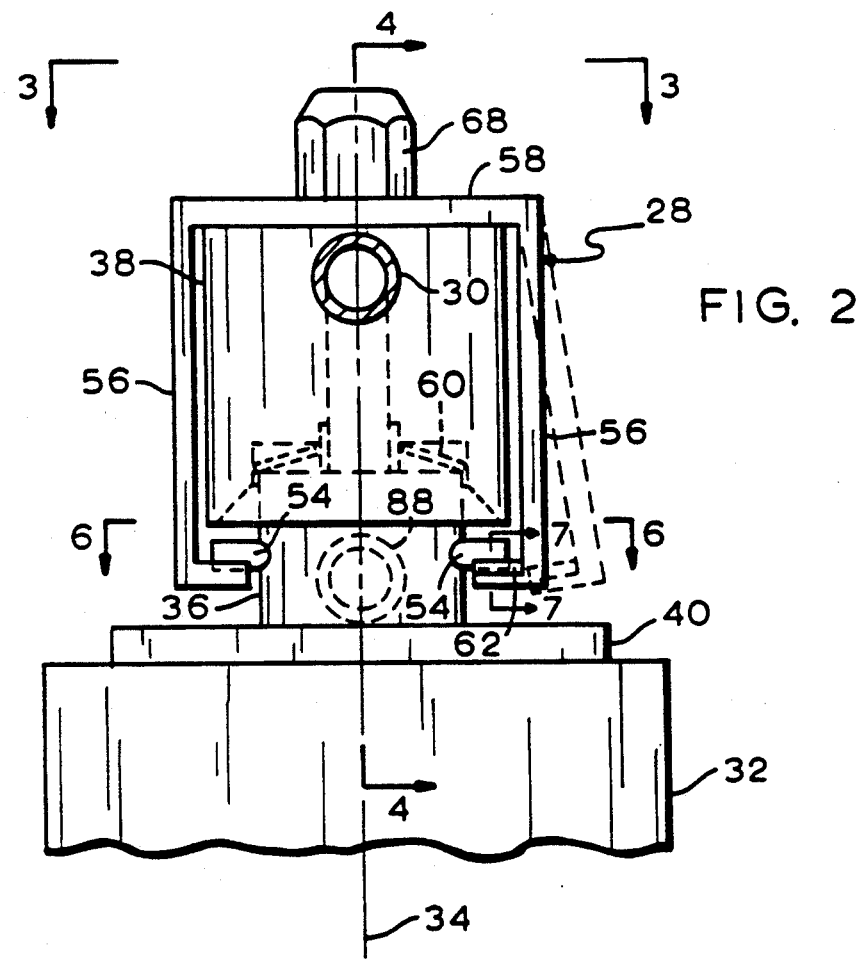
FIG. 2 is a front elevation view of the fluid coupling illustrated in FIG. 1 taken along line 2—2.
Figure 3:
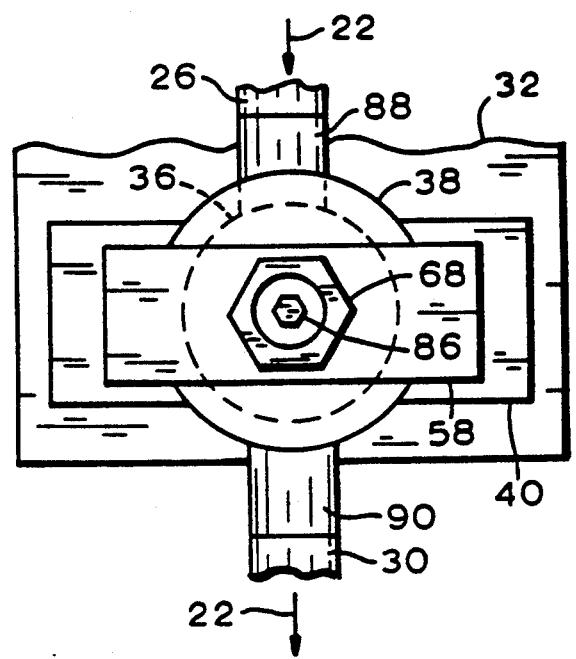
FIG. 3 is a top view of the fluid coupling illustrated in FIG. 2 taken along line 3—3.
Figure 4:
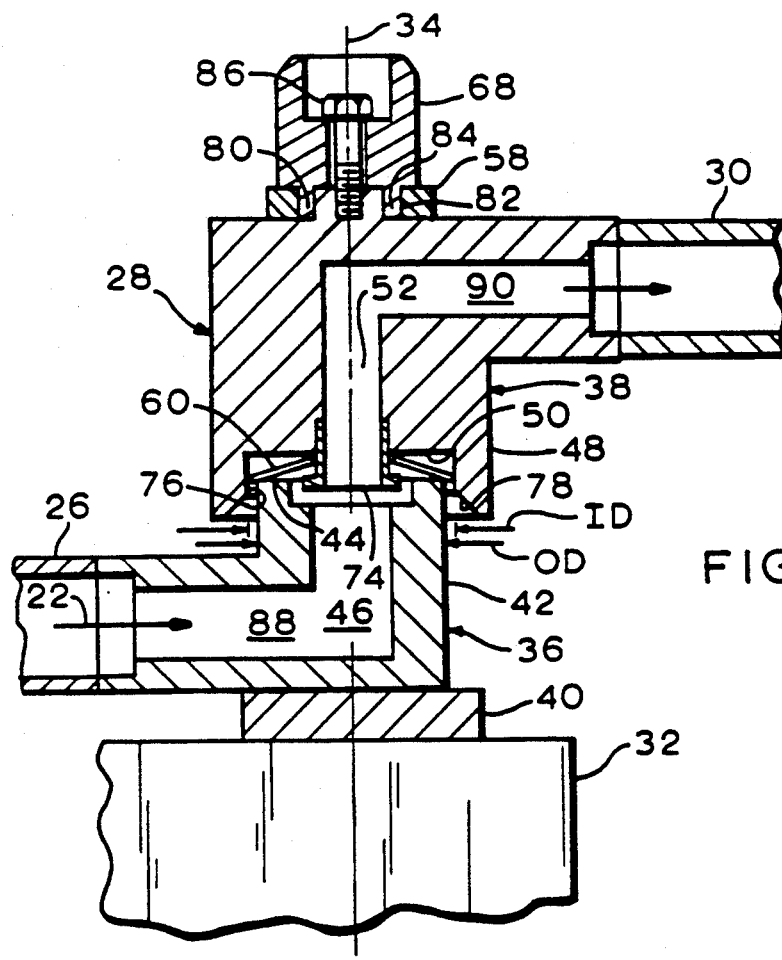
FIG. 4 is a longitudinal sectional view of the fluid coupling illustrated in FIG. 2 taken along line 4—4.

Illustrated in more particularity in FIGS. 2–4 is the fluid coupling 28 in accordance with one embodiment of the present invention. The fluid coupling 28 includes longitudinal axis 34 and first and second fittings 36 and 38, respectively, which may be connected to and disconnected from each other in accordance with one embodiment of the present invention. The first, or lower, fitting 36, as shown in more detail in FIG. 4, is stationary and includes a base 40 conventionally fixedly connected to the support 32 by being welded or bolted thereto, for example. The first fitting 36 also includes a tubular first body 42 having an annular, first or outlet seat 44 disposed at a mating end thereof. A first fluid channel 46 extends through the first body 42 and the first seat 44.

Similarly, the second, or upper, fitting 38 includes a tubular second body 48 having an annular second, or inlet, seat 50 disposed at a mating end thereof, with the second seat 50 facing the first seat 44 when the fittings are joined together as shown in FIG. 4. A second fluid channel 52 extends through the second body 48 and the second seat 50 for providing fluid communication between the first and second fittings.

The first and second fittings 36 and 38 are removably joined together in accordance with one embodiment of the present invention by respective pairs of circumferentially spaced apart latch bosses 54 and latch arms 56 as shown, for example, in FIG. 2. The latch bosses 54 extend generally perpendicularly outwardly from the first body 42 and the longitudinal axis 34. The latch arms 56 are preferably elongate and are fixedly joined together at proximate ends thereof by an integral base member 58 extending therebetween and perpendicularly to the longitudinal axis 34. The base member 58 is fixedly joined to the second fitting 38 as disclosed in more detail below.

Figure 5:
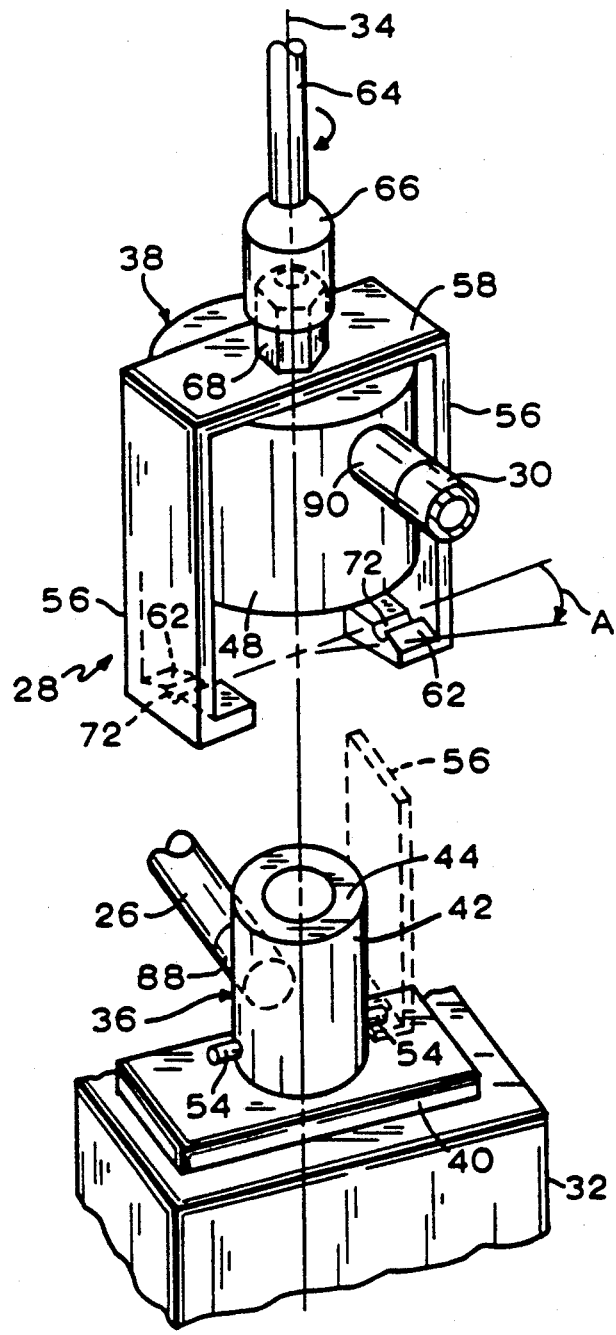
FIG. 5 is an exploded, perspective view of the fluid coupling illustrated in FIG. 1 and shown disconnected.

Illustrated in FIG. 5 is an exploded view of the fluid coupling 28 shown with the second fitting 38 disposed upwardly away from the first fitting 36 just prior to assembly thereof. During assembly, the second body 48 is suitably positioned over the first body 42 and disposed coaxially about the longitudinal axis 34 until the second seat 50 (see FIG. 4) is positioned adjacent to the first seat 44 with the latch arms 56 being disengaged from the latch bosses 54, which is referred to herein as the disengaged position. The disengaged position allows the two fittings 36 and 38 to be separated, which also separates the two seats 44 and 50. The second fitting 38 is rotatable in a clockwise direction relative to the first fitting 36 over an acute angle A of less than about 10°, for example, to a latched position, as shown in FIGS. 2–4, wherein the latch arms 56 engage the latch bosses 54, respectively, for maintaining the first seat 44 adjacent to the second seat 50 for allowing the fluid 22 to flow between the first and second channels 46 and 52.

As illustrated more particularly in FIG. 4, the fluid coupling 28 preferably includes a fluid seal in the form of, for example, a belleville washer 60 positioned between the first and second seats 44 and 50 for sealing fluid flow therebetween and preventing or minimizing the amount of the driving fluid 22 which might leak from the channels 46 and 52. The belleville washer 60 is preferred since it is relatively elastic and may be slightly compressed for cooperating with the latch arms 56 and the latch bosses 54 as disclosed below.

Figure 6:
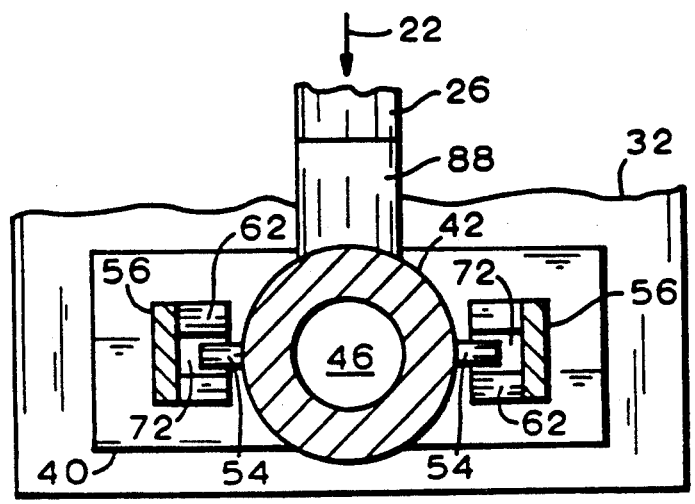
FIG. 6 is a transverse sectional view of the fluid coupling illustrated in FIG. 2 taken along line 6—6.

More specifically, in the preferred embodiment of the present invention, in the latched position, the first and second channels 46 and 52 are aligned parallel to the longitudinal axis 34 and the latch arms 56 (as shown in FIG. 2 for example) extend generally parallel to the longitudinal axis 34. As illustrated in more particularity in FIGS. 5–7, each of the latch arms 56 includes at a distal end thereof a ramp 62, or inclined surface, extending generally parallel to respective ones of the latch bosses 54 so that as the second fitting 38 is rotated toward the latched position (for example, clockwise over the angle A as shown in FIG. 5) relative to the first fitting 36 about the longitudinal axis 34, each of the latch bosses 54 slides upwardly on the ramps 62 for pulling together the first and second fittings 36 and 38 for assisting in compressing the belleville washer seal 60 between the first and second seats 44 and 50. As shown in FIGS. 5 and 6, the ramps 62 on the two latch arms 56 face in opposite directions so that clockwise rotation of the latch arms 56 about the longitudinal axis 34 has the same pulling effect on both of the latch bosses 54.

As illustrated in FIGS. 1 and 5, the first fitting 38 may be readily coupled to the second fitting 36 even though the fittings are underwater by the use of an elongate wrenching tool 64 which includes an integral socket 66 at a distal end thereof which may be slidably positioned over a complementary wrenching lug 68 fixedly connected to the base member 58. The wrenching tool 64 includes a T-handle 70 at an opposite end thereof which may be located suitably distant from the fluid coupling 28 and outside of the water 14 for connecting together and disconnecting the fluid coupling fittings 36 and 38 by clockwise and counterclockwise rotation of the second fitting 38. The wrenching tool 64, itself, may be used to provide an axial load on the second fitting 38 to initially compress the seal 60 for allowing the latch arms 56 to readily engage the latch bosses 54. Such axial load may be provided hydraulically by suitable conventional tools. However, with the preferred form of the latch arms 56 and the latch bosses 54 as described herein, the ramps 62 may be utilized either solely, or in conjunction with the application of additional axial force, for pulling together the first and second fittings 36 and 38 upon rotation of the second fitting 38 and the latch arms 56.

Figure 7:
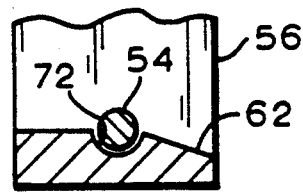
FIG. 7 is a longitudinal sectional view of one of the latch bosses and arms illustrated in FIG. 2 taken along line 7—7.

In order to lock the second fitting 38 to the first fitting 36 in the latched position, each of the ramps 62 preferably include an elongate recess 72 for receiving the respective latch boss 54 as illustrated, for example, in FIGS. 6 and 7. The recess 72 is aligned parallel to the latch boss 54 in the latched position, and in the exemplary embodiment illustrated, has an arcuate, or generally semicircular shape for receiving a portion of the latch boss 54 when the latch boss 54 is caused to slide upwardly over the ramps 62 into the recess 72 upon rotation of the latch arms 56 in the clockwise direction. The belleville washer is preferably compressible to allow the latch bosses 54 to slide upwardly over the ramps 62 and then into the recesses 72.

To disassemble the fluid coupling 28, the wrenching tool 64 is rotated counterclockwise and thusly rotates counterclockwise the latch arms 56 which initially slightly further compresses the washer 60 as the latch bosses 54 are urged out of the recesses 72 and then down the ramps 62. The latch arms 56 are further rotated counterclockwise until the ramps 62 clear the bosses 54, which is the disconnected position. The second fitting 38 may then be pulled away from the first fitting 36 by the wrenching tool 64, or other suitable means.

In the preferred embodiment of the present invention as illustrated in FIG. 4, the belleville washer 60 is fixedly connected to the second body 48 at the second channel 52 by a tubular retainer 74 which extends through the belleville washer 60 and is suitably fixedly joined to the second channel 52 at one end thereof, by an interference fit for example, with the other end thereof being enlarged for preventing the belleville washer 60 from sliding off the retainer 74. The belleville washer 60 is also preferably disposed within a cylindrical recess 76 which has an inner diameter ID slightly greater than the outer diameter OD of the first body 42. A chamfer 78 is preferably provided around the mating end of the second body 48 at the recess 76 for guiding the first fitting 38 over the second fitting 36 during assembly so that the first and second seats 44 and 50 are aligned. The retainer 74 therefore, prepositions the belleville washer 60 and prevents it from falling from the second fitting 38 as the two fittings are brought together during assembly.

As illustrated in FIG. 4, the base member 58 supporting the latch arms 56 is preferably fixedly joined to the second body 48 by the wrenching lug 68. Relative rotational movement between these components may be eliminated by providing, for example, an integral square boss 80 extending outwardly from the second body 48 through a complementary square shaped hole 82 through the center of the base member 58, and between which boss 80 and hole 82 is a complementary square flange 84 integral with the lug 68. The lug 68 overlaps the hole 82, and a conventional bolt 86 may be conventionally fixedly joined through the center of the lug 68 and the boss 80 for fixedly joining together the lug 68, base member 58, and the second body 48. This arrangement allows for substantial torque to be applied to the lug 68 by the wrenching tool 64 for rotating the latch arms 86 between the latched and disengaged positions.

In the event that during extended use in service the latch bosses 54 temporarily freeze, by corrosion for example, to the recesses 72, the present invention nevertheless allows for disassembly thereof. More specifically, the latch arms 56 are preferably formed of a suitable corrosion resistant metal such as stainless steel and are preferably longitudinally rigid. However, by having elongate latch arms 56, which are suitably thin in the transverse direction, the latch arms 56 are elastically flexible in a direction perpendicular to the longitudinal axis 34. As shown in dashed line in FIG. 2, each of the latch arms 56 may be suitably deflected away from its mating latch boss 54 in the event the latch arms 56 are unable to be rotated counterclockwise for disassembly thereof. The latch arms 56 may either be elastically or plastically deformed, as required, in order to allow the second fitting 38 to be disassembled from the first fitting 36. Any conventional and appropriate tool may be used for so deflecting the latch arms 56, including, for example, a hydraulically operated wedge.

Referring again to FIG. 4, for example, in the preferred embodiment of the present invention, the first and second channels 46 and 52 are aligned generally parallel with the longitudinal axis 34. Any suitable and conventional conduit may be joined to the channels 46 and 52 for channeling the fluid 42 into and out of the coupling 28. For example, in the exemplary embodiment of the invention illustrated in FIG. 4, the first fitting 36 further includes an inlet 88 formed integrally with the first body 42 and in flow communication with the first channel 46, and perpendicularly thereto. Similarly, an outlet 90 is preferably formed integrally with the second body 48 in flow communication with the second channel 52 and perpendicularly thereto. The inlet 88 may be suitably fixedly joined to the first conduit 26 by any conventional coupling, or may be conventionally welded or brazed thereto. Similarly, the outlet 90 may be conventionally joined to the second conduit 30 by any conventional coupling, or may be brazed or welded thereto. Of course, the direction of fluid flow 22 through the fluid coupling 28 may be reversed from that shown, with the fluid 22 entering through the outlet 90 and leaving through the inlet 88.

The second conduit 30 may be flexible to allow the second fitting 38 to be disconnected from the first fitting 36 while the second conduit 30 is still attached thereto. However, the second conduit 30 may be firstly conventionally disconnected from the outlet 90 of the second fitting 38 before the second fitting 38 is rotated for disassembly from the first fitting 36.

While there has been described herein what is considered to be a preferred embodiment of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A fluid coupling having a longitudinal axis comprising:
   a first fitting including:
      a first body;
      an annular first seat disposed at a mating end of said first body;
      a first fluid channel extending through said first body and said first seat; and
      a pair of spaced latch bosses extending outwardly from said first body; a second fitting including:
      a second body;
      an annular second seat disposed at a mating end of said second body facing said first seat;
      a second fluid channel extending through said second body and said second seat;
      a base member fixedly joined to said second fitting perpendicularly to said longitudinal axis;
      a wrenching lug fixedly joined to said base member; and
      a pair of spaced latch arms being elongate and fixedly joined together at proximate ends thereof by said base member extending therebetween; and
   said second fitting being rotatable relative to said first fitting by said wrenching lug to:
      a latched position wherein said first and second channels are aligned parallel to said longitudinal axis, said latch arms extend generally parallel to said longitudinal axis, said latch bosses extend generally perpendicularly to said longitudinal axis, and said latch arms engage said latch bosses for maintaining said first seat adjacent to said second seat for allowing said fluid to flow between said first and second channels, and to a disengaged position wherein said latch arms and pins are disengaged to allow said first and second seats to be separated.

2. A fluid coupling according to claim 1 further including an annular fluid seal positioned between said first and second seats for sealing fluid flow therebetween.

3. A fluid coupling according to claim 2 wherein:
said fluid seal is compressible; and
each of said latch arms includes at a distal end thereof a ramp extending generally parallel to a respective one of said latch bosses so that as said second fitting is rotated toward said latched position relative to said first fitting about said longitudinal axis each of said latch bosses slides upwardly on said ramp for pulling together said first and second fittings for compressing said seal between said first and second seats.

4. A fluid coupling according to claim 3 wherein said ramp includes a recess for receiving said latch boss upon rotation to said latched position for maintaining said first and second fittings in said latched position.

5. A fluid coupling according to claim 4 wherein said fluid seal comprises a belleville washer.

6. A fluid coupling according to claim 5 further including a retainer extending through said belleville washer and fixedly joined to said second channel for retaining said washer to said second fitting.

7. A fluid coupling according to claim 5 wherein said second body mating end further includes a chamfer for guiding said first body mating end thereto for aligning said first and second seats.

8. A fluid coupling according to claim 5 wherein said latch arms are flexible in a direction perpendicular to said longitudinal axis.

9. A fluid coupling according to claim 5 wherein:
said first fitting further includes an inlet disposed in flow communication with said first channel for channeling a pressurized fluid thereto;
said second fitting further includes an outlet disposed in fluid communication with said second channel, and perpendicularly thereto, for discharging said pressurized fluid therefrom.

* * * * *